Patented June 21, 1949

2,474,004

UNITED STATES PATENT OFFICE 2,474,004

PROCESS FOR THE PREPARATION OF ETHYLENEUREA

Donald J. Loder, Wilmington, Del., assignor to E. I. du Pont de Nemours & Company, Wilmington, Del., a corporation of Delaware No Drawing. Original application March 1, 1944, Serial No. 524,520. Divided and this application April 15, 1947, Serial No. 741,679

4 Claims. (Cl. 260—309)

This invention relates to a process for the preparation of N.N'ethyleneurea, and more particularly to its preparation from ethylene glycol and urea. This application is a division of the copending application Serial No. 524,520, filed March 1, 1944, now U. S. Patent 2,425,627.

N.N'ethyleneurea, hereinafter referred to as ethyleneurea, and otherwise known as 2 oxo imidazolidin and imidazolidon-(2), has been made by heating ethylene diamine with diethyl carbonate at 180° C. [E. Fisher, Koch, A 232, 227 (1886)], by warming an aqueous solution of N.N'ethylene thiourea with freshly precipitated mercuric oxide [Klut Ar. 240, 677 (1887)], and by distillation of aqueous N.N'ethylene guanidine under diminished pressure [Pierron A 9, (11) 363 (1908)]. Ethyleneurea has, however, remained more or less a laboratory curiosity, for the above processes have, to date, been of only academic significance.

An object of the present invention is to provide a process for the preparation of ethyleneurea. Another object of the invention is to provide a process for the preparation of ethyleneurea from ethylene glycol and urea. A further object is to provide improved procedural details for the preparation of ethyleneurea, including efficient and economical methods for transformation of the product obtained from the reaction of ethylene glycol with urea to ethyleneurea. Other objects and advantages of the invention will hereinafter appear.

The above objects are realized by a process wherein ethyleneurea is prepared from urea and ethylene glycol by an economical process giving commercially acceptable yields of the product. The process involves three main steps:

1. Reaction of urea with ethylene glycol to form a crude reaction mixture of melt containing ethyleneurea and potential ethyleneurea.

2. Transformation of the crude reaction mixture or melt to convert the ethyleneurea potentially present to ethyleneurea by treatment with water.

3. Purification of the ethyleneurea and separating it from the water-treated crude product.

The first step of the process is conducted by dissolving urea in glycol, gradually heating the solution to reaction temperature and holding it at temperature until the reaction has proceeded to the desired extent. The reaction is conducted in a suitable converter, preferably provided with a reflux condenser and an off-gas scrubber. During the initial stages of the reaction, some glycol vapor is condensed in the reflux condenser and is returned to the reaction zone, while the remaining vapors, ammonia and carbon dioxide, pass through the reflux condenser to suitable scrubbers for their recovery. At the end of the reaction period, the product, a viscous liquid (which may be a solid when cooled) containing ethyleneurea and potential ethyleneurea, is discharged into water or other suitable solvent.

This step of the reaction is conducted at temperatures ranging up to 200 or 250° C. or above. At temperatures above 250° C., however, the crude product is somewhat darkened in color, and accordingly it is found preferable to carry out the reaction at temperatures ranging between 100 and 250° C., the temperature being increased gradually to maximum temperature, the time required to heat the reactants from in the proximity of 125° C. to about 175° C. being in the neighborhood of from 2 to 8 hours, and from 175 to about 250° C. in the neighborhood of from 2 to 6 hours, the total time of reaction ranging from 4 to 24 hours.

It has been found that the reaction mixture of ethylene glycol and urea should be heated to a temperature of at least 200° C., and preferably 225° C. prior to the termination of the reaction, irrespective of the ratio of reactants. For example, if a reaction mixture containing an excess of ethylene glycol, say, in the order of 2 moles of ethylene glycol per mole of urea, is heated under atmospheric pressures to its boiling point and maintained at that temperature for an appreciable period of time, substantially no ethyleneurea is produced nor can there be obtained from such a reaction mixture any ethyleneurea by the water-treating process more fully particularized hereinafter. In order to obtain ethyleneurea in optimum amounts, high temperature treatment is required, and if glycol is present in excess, it is necessary to conduct the reaction under pressure which may be induced or autogenous in order that the reaction may be conducted at the higher temperatures; pressures ranging above 5 atmospheres to 100 atmospheres or higher may be used. In the event that the reaction mixture contains an excess of urea, such a mixture, even under atmospheric pressures, can generally be heated to a temperature in the neighborhood of 225° C., and consequently pressure treatment in this instance is not required to reach temperature, but may be employed if desired.

The grade of the glycol employed is not critical, although pure ethylene glycol will give most satisfactory results. The urea employed should for best results likewise be pure although normally occurring impurities found in synthetic urea do not appear to deleteriously affect the reaction. Inasmuch as the reaction temperature is well above the boiling point of water the use of anhydrous ethylene glycol and crystal urea eliminates the necessity of boiling off the water introduced by aqueous solutions of these materials and also avoids loss of urea by hydrolysis.

It has been found that the ratio of urea to ethylene glycol on a weight basis should range preferably between from 2 to 7 moles of the urea per mole of the ethylene glycol, with the preferred range between 3 and 6 moles of urea per mole of the glycol. The solution of urea in ethylene glycol should preferably contain at least 70% urea and at least 15% ethylene glycol by weight. The above proportions are preferred, although, as was stated, ethyleneurea can be obtained with an excess of ethylene glycol present if the designated reaction conditions are used.

The converter in which the reaction may be carried out may be lined with silver, chromium, chrome steel, vitreous enamel or constructed of some other suitable corrosion-resisting material in order to resist the corrosive action of the reactants.

The invention covered by the application is principally directed to treatment of the product obtained as described under step 1 with water in order to recover ethyleneurea which is potentially present. The water treatment results in the transformation of potentially available ethyleneurea to ethyleneurea. Ethyleneurea is recoverable by vacuum distillation from the untreated product of step one in amounts ranging up to a maximum of about 25 to 30%, if the reaction product resulted, for example, from a mixture containing excess urea, while optimum yields of the product are obtained only by subjecting the product of the first step to water treatment.

The second step of the process is conducted by first discharging the product (usually in the form of a viscous liquid or crude melt) of the first step into water to give 25 to 75% of the product in water. Owing to the presence of by-products and insoluble or semi-soluble materials, solution is not usually complete as there may be some suspended or partially dissolved material. This step of the process, which may likewise be called the water treatment or hydrolysis step, may be carried out by several general methods.

In accord with the pressure processing method, an aqueous mixture of the product from step one is passed through a heated tube or into a pressure-resisting autoclave. The crude product, usually a melt, from synthesis charges containing 5 moles of urea per mole of glycol is preferably diluted with, in parts by weight, 2 parts of water per 3 parts of melt prior to treatment. As dilution with water below about 30% causes separation of a heavy, semi-solid phase which tends to clog pumps, the concentration of melt is preferably kept above this amount. Optimum concentrations for melts prepared from 4 to 6 moles of urea per mole of glycol is between 30 and 70% on a weight basis. The dilution is preferably accomplished by dumping the hot melt directly into the cold water with agitation, the melt during its rapid cooling being comminuted and thereby rapidly dissolved and/or dispersed into the water.

The temperature of the water treatment should be between 200 and 300° C. and preferably between 250 and 280° C., although higher, and for that matter lower, temperatures may be employed according to the time of contact. For example, at 250° C., time of contact in the order of 70 minutes for optimum transformation may be cut to 25 minutes with temperatures in the order of 270° C. Pressures are not critical, except in so far as it is necessary to maintain the mixture in the liquid phase to obtain most efficient use of the pressure equipment. They may range from 10 to 100 atmospheres or higher.

Alternatively the product of step 1 may be subjected to steam distillation under sub-, normal-, or superatmospheric pressures, wherein the ethyleneurea present is distilled over while the potential ethyleneurea is converted during the steam distillation to ethyleneurea and also distilled over. In addition to effecting such a transformation, steam distillation likewise aids in separating the ethyleneurea from the by-products of the reaction. If desired, the product may be diluted with water and heated as described under the discussion of pressure processing method prior to being subjected to steam distillation.

The third step of the process involves the purification by rectification of the ethyleneurea from the product obtained from the process of the second step. A suitable still, for example, is charged with the product of the second step, water and dissolved gases stripped off at atmospheric pressure; the pressure is reduced and intermediate-boiling by-products and the ethyleneurea distilled over.

The refined ethyleneurea may be discharged from the purifying still receiver directly to a rotating cold flaker roll upon which the ethyleneurea solidifies as the roll revolves. The product is removed therefrom by a suitable doctor-knife to give a flaky material. Since ethyleneurea tends to form a hemi-hydrate, humid air is excluded from the operation and the packaging of the product.

Alternatively the product from step two may be subjected to crystallization for the separation of the ethyleneurea, the crystallization being conducted in a suitable solvent therefor.

Examples are now given illustrating preferred embodiments of the invention, wherein parts are by weight unless otherwise indicated.

*Example 1.*—The first step of the process was conducted in a silver-lined pressure-resisting autoclave, provided with a reflux condenser and charged with 12.02 parts of urea dissolved in 3.55 parts of glycol, molecular weight ratio of urea: glycol, 3.5:1. Solution of the urea was effected at a temperature of approximately 140° C. The heating time from solution temperature to 175° C. was approximately 6.5 hours; the time from 175° C. to maximum temperature, 250° C., 4.25 hours; and the time at maximum temperature, approximately 2.5 hours.

The crude melt obtained by the above first step of the process was discharged directly and without cooling into 1½ pounds of water per pound of melt. The resulting mixture was further diluted to give a mixture containing 6.3 parts of melt to 9.5 parts of water, and the resulting mixture was continuously introduced at the rate of 18 cc. per minute into a tubular, pressure-resisting converter consisting of a helical coil of approximately ½" inside diameter and 10' in length. The melt was heated in this coil to a temperature of approximately 250° C. under a pressure of approximately 500 lbs. per sq. in.; the contact time of the mixture at temperature was approximately 35 min.

The thus treated product from the second step was charged into a suitable still, and the dissolved gases and water stripped from the mixture under atmospheric pressure, using a 1:1 reflux ratio and a pot temperature rising to a final value approximately between 150 and 170° C. By-products were then removed by distillation under pressure of approximately 70 mm. mercury absolute pressure, and a pot temperature up to 190 to 200° C. The resulting residue was fed into an evaporator and cyclone separator in which it was separated into semi-refined ethyleneurea as distillate and high boiling by-products as residue, under 5 mm. mercury absolute pressure, at a temperature of about 250° C. The semi-refined product was then further purified by distillation in a batch-still, under a head pressure at 5 mm. mercury absolute. The ethyleneurea distilling at a head temperature of approximately 179° C. The ethyleneurea was obtained in a conversion based on the glycol of 55%.

*Example 2.*—A. 360 parts of urea were dissolved in 93 parts of ethylene glycol giving a molar ratio of 4:1 urea to glycol, and the resulting mixture is gradually heated in a suitable reaction vessel to a temperature between 160 to 180° C. over a period of 6.5 hours, from a temperature of 180 to 240° C. over a period of 3 hours, and at a temperature of 240° C. for one hour. 172 parts of crude melt was recovered and subjected without water treatment to simple vacuum distillation for the recovery of ethyleneurea. The conversion of ethylene glycol to ethyleneurea was approximately 25%.

B. A reaction converter was charged with 1680 parts of urea and 434 parts of ethylene glycol, giving a mole ratio of 4:1. The reaction was carried out under substantially identical conditions as those employed in A, and 830 parts of the crude melt were produced. This crude melt was subjected to transformation in accord with the second step of the process, conducted substantially in accord with that step as described in Example 1. From this transformed crude melt ethyleneurea was recovered with a conversion of approximately 55% based on ethylene glycol.

Table I represents a series of examples conducted substantially in accord with the procedure described in Example 1 for the first step, except for the variations in concentrations, temperatures and other items noted, with the procedure of Example 1, except as stated under column 8, for the third step. The continuous procedure of step 2 is illustrated by step 2 of Example 1, while the discontinuous procedure may be carried out batchwise in a suitable autoclave under the conditions specified in the table.

*Table*

|  | Example Numbers | | | | | |
|---|---|---|---|---|---|---|
|  | 3 | 4 | 5 | 6 | 7 | 8 |
| Step I: | | | | | | |
| Charge, parts by weight— | | | | | | |
| Urea | 77.2 | 77.2 | 77.2 | 12.02 | 12.02 | 39.38 |
| Glycol | 22.8 | 22.8 | 22.8 | 2.49 | 2.49 | 10.2 |
| Urea/Glycol (mole per mole) | 3.5 | 3.5 | 3.5 | 5.0 | 5.0 | 5.0 |
| Reaction— | | | | | | |
| Pot temp.—start, °C | 140 | 140 | 140 | 150 | 150 | 144 |
| Pot temp.—end, °C | 253 | 253 | 253 | 251 | 251 | 225 |
| Time to 175° C., hrs | 8.5 | 8.5 | 8.5 | 8.0 | 8.0 | 6.0 |
| Time 175 to Max. Temp | 5.5 | 5.5 | 5.5 | 4.0 | 4.0 | 5.0 |
| Time at Max. Temp | 4.5 | 4.5 | 4.5 | 0 | 0 | 0 |
| Weight of crude melt | 33 | 33 | 33 | 5.99 | 5.99 | 20.4 |
| Step II: | | | | | | |
| Discontinuous— | | | | | | |
| Wt. ratio, melt: water | 1:1 | 1:1 |  | 1:1 |  |  |
| Pot temp., °C | 255 | 248 |  | 250 |  |  |
| Pressure, p. sq. in | 395 | 420 |  | 850 |  |  |
| Total time, hrs | 2 | 2 |  | 2 |  |  |
| Continuous— | | | | | | |
| Crude melt, lbs |  |  | 5.87 |  | 2.21 | 6.35 |
| Water, lbs |  |  | 9.58 |  | 3.31 | 9.52 |
| Solids, per cent |  |  | 40 |  | 40 | 40 |
| Temp., °C |  |  | 270 |  | 250 | 250 |
| Pressure, p. sq. in |  |  | 500 |  | 500 | 500 |
| Contact time, hrs |  |  | 21 |  | 68.5 | 31 |
| Step III (Same as Example 1): Conversion glycol to ethyleneurea | 47.8 | 51.5 | 42.2 | 54 | 55 | [1] 22 |

[1] Crystallized.

All steps of the process may, if desired, be carried out continuously, the first step by passing the mixture of ethylene glycol and urea through a heated tube of relatively great length to diameter, the flow being so controlled that the above described temperature cycle is used; the second step, by utilizing the continuous process, as described above; and the third step by passing the products of the first and/or second step through a suitable rectification process.

I claim:
1. In a process for the preparation of ethyleneurea from ethylene glycol and urea the steps which comprise discharging, into water and without cooling the reaction product, obtained by heating a reaction mixture containing ethylene glycol and urea, the ethylene glycol being in excess, to a temperature between 150 and 250° C. and under a pressure in excess of 5 atmospheres, heating the resulting mixture to a temperature between 200 and 300° C., and subsequently recovering ethyleneurea therefrom.

2. In a process for the preparation of ethyleneurea from ethylene glycol and urea, the step which comprises treating with water and at a temperature between 200 and 300° C. the reaction product obtained by heating a mixture of ethylene glycol and urea, the ethylene glycol being present in excess, to a temperature between 150 and 250° C. at a pressure about 5 atmospheres.

3. In a process for the preparation of ethyleneurea from ethylene glycol and urea, the step which comprises treating with water and at a temperature between 250 and 280° C. the reaction product obtained by heating a mixture of ethylene glycol and urea, the ethylene glycol being present in excess, to a temperature between about 150 and about 250° C. at a pressure of at least 5 atmospheres.

4. In a process for the preparation of ethyleneurea from ethylene glycol and urea, the step which comprises subjecting to steam distillation the reaction product obtained by heating a mixture of ethylene glycol and the urea, ethylene glycol being present in excess, to a temperature between about 150 and about 250° C. at a pressure in excess of 5 atmospheres, the steam distillation being carried out after the reaction product has been treated with water at a temperature between 250 and 280° C.

DONALD J. LODER.

REFERENCES CITED

The following references are of record in the file of this patent:

UNITED STATES PATENTS

| Number | Name | Date |
|---|---|---|
| 2,416,057 | Larson et al. | Feb. 18, 1947 |
| 2,425,627 | Loder | Aug. 12, 1947 |